(12) United States Patent
Lynam

(10) Patent No.: US 8,063,904 B2
(45) Date of Patent: Nov. 22, 2011

(54) PROJECT TIMELINE VISUALIZATION METHODS AND SYSTEMS

(75) Inventor: Jeff Ronald Lynam, Roanoke, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 541 days.

(21) Appl. No.: 12/324,054

(22) Filed: Nov. 26, 2008

(65) Prior Publication Data

US 2010/0128040 A1   May 27, 2010

(51) Int. Cl.
*G06T 11/20* (2006.01)
(52) U.S. Cl. ........................................ 345/440
(58) Field of Classification Search .................. 345/440
See application file for complete search history.

(56) References Cited

U.S. PATENT DOCUMENTS

| | | | |
|---|---|---|---|
| 7,028,036 B2 | 4/2006 | Chickering et al. | |
| 7,263,474 B2 | 8/2007 | Fables et al. | |
| 7,353,223 B2 | 4/2008 | Klein | |
| 2003/0050065 A1 | 3/2003 | Alletson et al. | |
| 2003/0066032 A1 | 4/2003 | Ramachandran et al. | |
| 2004/0117768 A1 | 6/2004 | Chang et al. | |
| 2005/0165881 A1* | 7/2005 | Brooks et al. | 709/200 |
| 2005/0222881 A1 | 10/2005 | Booker | |
| 2006/0044307 A1 | 3/2006 | Song | |
| 2006/0095457 A1 | 5/2006 | Glasspool et al. | |
| 2006/0179412 A1 | 8/2006 | Clymer et al. | |
| 2008/0215970 A1* | 9/2008 | Tsuji et al. | 715/702 |

OTHER PUBLICATIONS

International Search Report for PCT/US09/57268 dated Mar. 29, 2010.

* cited by examiner

*Primary Examiner* — Ryan R Yang
(74) *Attorney, Agent, or Firm* — RatnerPrestia

(57) ABSTRACT

Methods, systems, and computer readable storage mediums for presenting project information are disclosed. Project information may be presented by receiving electronic planning information associated with a project, the planning information including project resource data, transforming the received electronic planning information into a graphical representation of the received electronic planning information for visual presentation to a user and presenting the graphical representation of the received planning information for perception by the user, the presented graphical representation including one or more lines that varies in width symmetrically over time based on the project resource data.

20 Claims, 4 Drawing Sheets

PROJECT TIMELINE VISUALIZATION METHODS AND SYSTEMS

BACKGROUND OF THE INVENTION

A Gantt chart is a bar chart that uses a horizontal bar to represent a project schedule as a function of time. Different phases of a project may be represented on a Gantt chart by different bars. In tracking a project's schedule it may be useful to know additional information relating to phases of the project. Traditional Gantt charts only display the project schedule as a function of time. Other types of project tracking techniques tend to overly complicate the display of information. Therefore, there is a need for an improved method for displaying project information.

SUMMARY OF THE INVENTION

Aspects of the present invention are embodied in methods, systems, and computer readable storage mediums for presenting project information. Project information may be presented by receiving electronic planning information associated with a project, the planning information including project resource data, transforming the received electronic planning information into a graphical representation of the received electronic planning information for visual presentation to a user, and presenting the graphical representation of the received planning information for perception by the user, the presented graphical representation including one or more lines that varies in width symmetrically over time based on the project resource data.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale. On the contrary, the dimensions of the various features are arbitrarily expanded or reduced for clarity. Included in the drawings are the following figures.

DETAILED DESCRIPTION OF THE INVENTION

Figure 1:
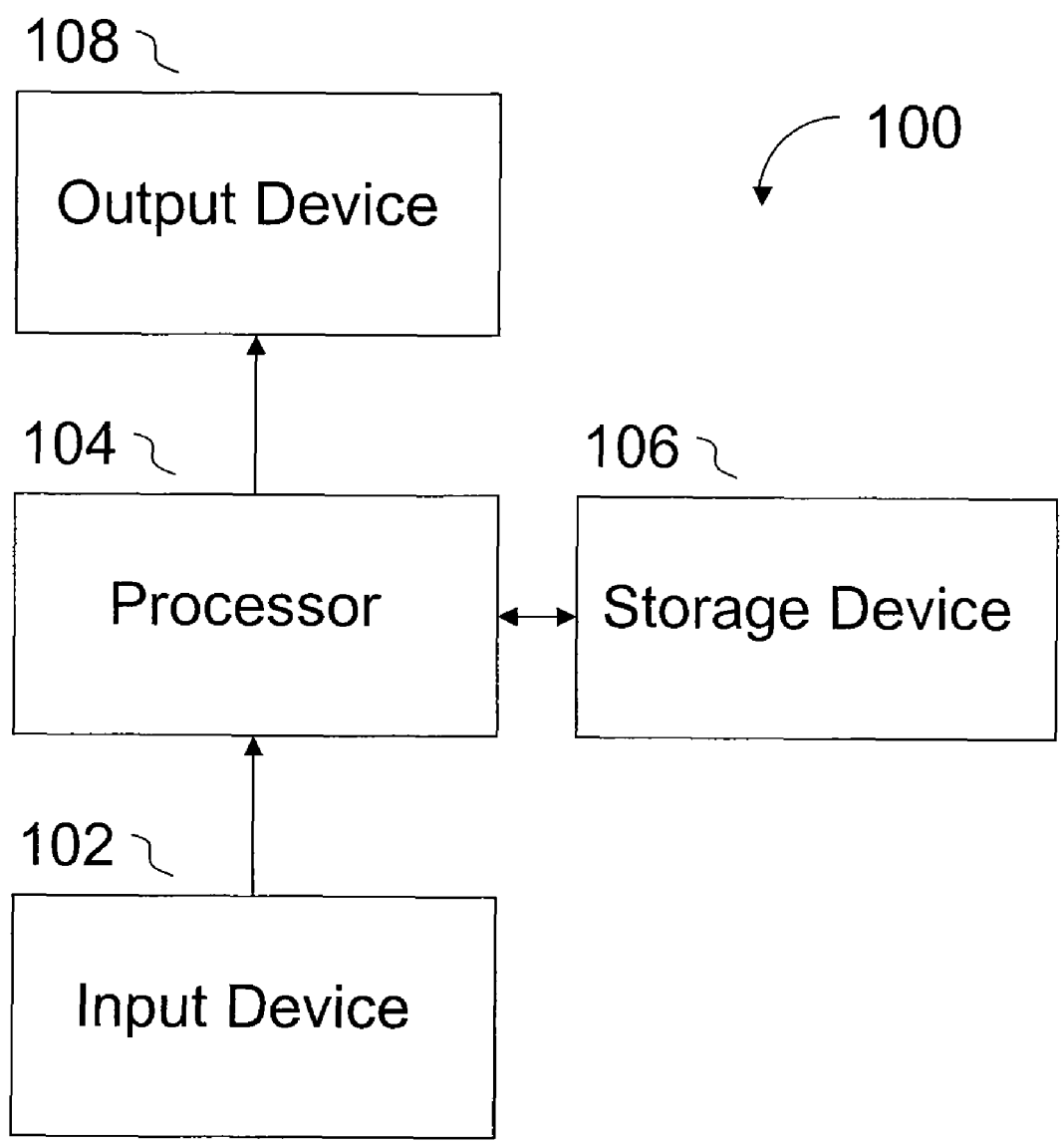
FIG. 1 is a block diagram depicting an exemplary system for presenting information associated with a project in accordance with an aspect of the present invention.

FIG. 1 depicts an exemplary system 100 for presenting information associated with a project in accordance with one aspect of the present invention. Exemplary projects may include, by way of non-limiting example: software development projects, construction projects, mechanical device development projects, electronic device development projects, and landscaping or architectural projects. The project information may include, for example, project phases, project schedules, or resource data associated with the project. The project phases and project schedules may include information concerning allotted time or deadlines for the project or project phases. The resource data may include, for example, costs, personnel, or other resources associated with the project or project phase.

As a general overview, system 100 includes input device 102, processor 104, storage device 106, and output device 108. Additional details of system 100 are provided below.

Input device 102 receives input from the user and provides electronic data to processor 104. The electronic data may include project information. In an exemplary embodiment, input device 102 may be a keyboard, mouse, or other computer peripheral device capable of receiving input from an external source.

Processor 104 receives electronic data from input device 102 and transforms that electronic data into a graphical representation for visual presentation to a user. Processor 104 may store received electronic data in storage device 106 (described below). In an exemplary embodiment, processor 104 may generate a graphical representation of project information included in the electronic data. The graphical representation may include one or more lines that vary as a function of time. The lines may correspond to different projects or to different phases of the same project. The lines may vary in width symmetrically corresponding to the resource data associated with the project or project phase. Processor 104 may then provide the graphical representation to the output device 108 (described below). A suitable processor for use with the present invention will be understood by one skilled in the art from the description herein.

Storage device 106 stores electronic data received from processor 104. In an exemplary embodiment, processor 104 may receive project information from input device 102 and may transmit project information and/or a graphical representation of the project information to storage device 106 for storage. Processor 104 may access stored project information in order to generate a graphical representation of the project information and/or access the stored graphical representation. A suitable storage device for use with the present invention will be understood by one skilled in the art from the description herein.

Output device 108 receives electronic data from processor 104 and outputs the data for visual presentation to a user. The electronic data may include graphical representations of project information. In an exemplary embodiment, output device 108 may be a computer display, printer, or other computer peripheral device capable of generating output from received electronic data for visual presentation to a user.

Figure 2:
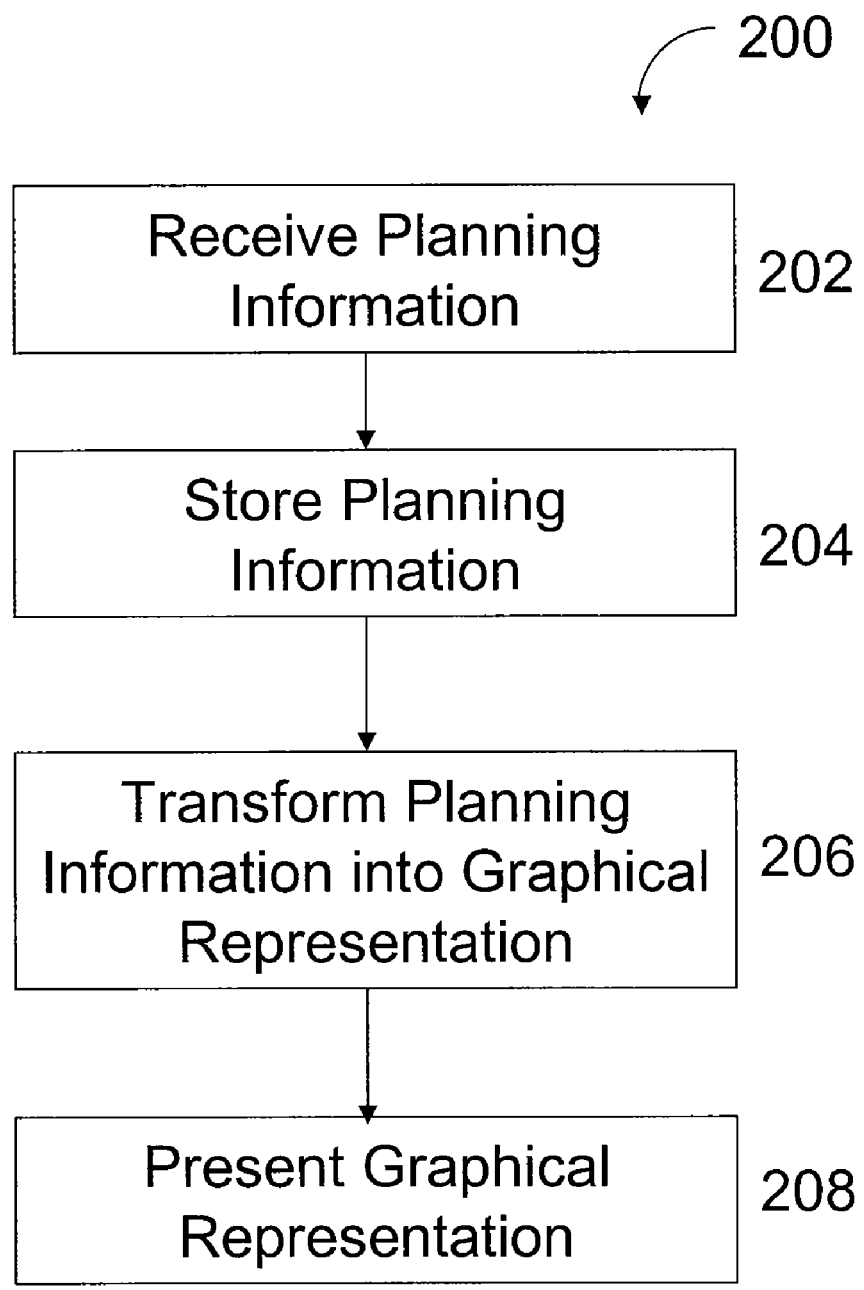
FIG. 2 is a flow chart of exemplary steps for presenting information associated with a project in accordance with an aspect of the present invention.

FIG. 2 is a flow chart 200 depicting exemplary steps for presenting information associated with a project in accordance with one aspect of the present invention. To facilitate description, the steps of FIG. 2 are described with reference to the system components of FIG. 1. It will be understood by one of skill in the art from the description herein that one or more steps may be omitted and/or different components may be utilized without departing from the spirit and scope of the present invention.

In step 202, planning information is received. In an exemplary embodiment, planning information associated with a project may be received by processor 104 from input device 102. Exemplary planning information may include, for example, project phases, project schedules, or resource data associated with the project. The project phases and project schedules may include information concerning allotted time or deadlines for the project or project phases. The resource data may include, for example, costs, personnel, or other resources associated with the project or project phase. Input of the planning information may be facilitated through the use of a graphical user interface (GUI) including data entry boxes and/or drop down menus. A suitable GUI for use with the present invention will be understood by one of skill in the art from the description herein.

In step 204, the received planning information is stored. In an exemplary embodiment, processor 104 may store the planning information in storage device 106.

In step 206, the planning information is transformed into a graphical representation for visual presentation to a user. In an exemplary embodiment, processor 104 may generate a graphical representation from the planning information associated with a project. Processor 104 may generate the information from the stored planning information or from the received planning information. The graphical representation may include one or more lines that vary as a function of time. The lines may correspond to different projects or to different phases of the same project. The lines may vary in width symmetrically corresponding to the resource data associated with the project or project phase. For example, the width of the line may increase as resources increase and may decrease as resources decrease.

In step 208, the graphical representation is presented for perception by a user. In an exemplary embodiment, processor 104 may transmit the graphical representation to output device 108. Output device 108 may then present the graphical representation to the user. For example, the graphical representation may be displayed on a visual display device such as a monitor or printed on a piece of paper using a printer.

Figure 3:
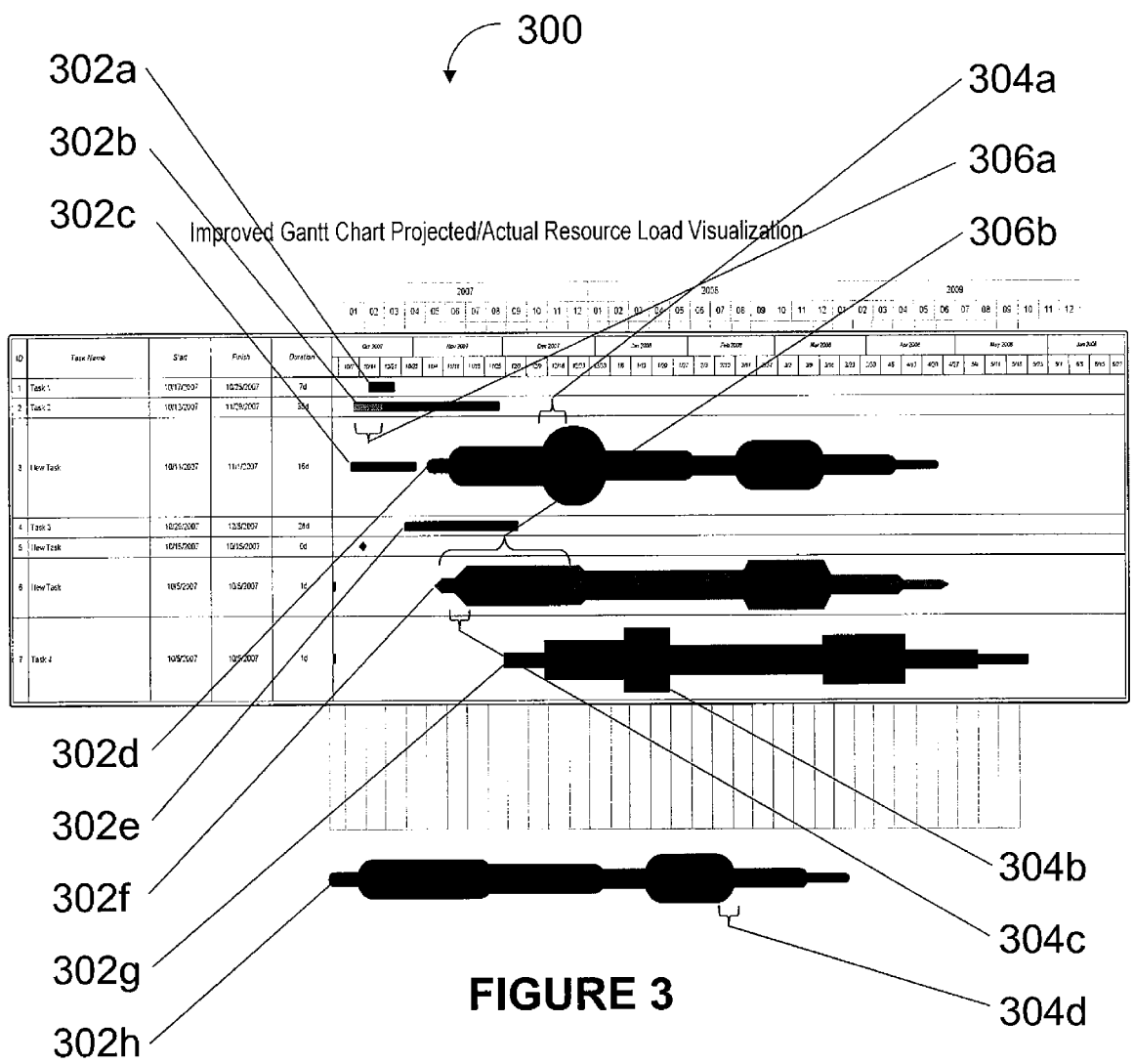
FIG. 3 is an exemplary graphical representation of information associated with a project in accordance with an aspect of the present invention.

FIG. 3 depicts an exemplary graphical representation 300 of project information for presentation to a user in accordance with one aspect of the present invention. The graphical representation depicts eight bars 302a-h with length varying over time, similar to a traditional Gantt chart format. Each bar 302a-h may correspond to a scheduled phase of a project. Bars 302d and 302f-h vary in width symmetrically to convey additional information about the project phase. In an exemplary embodiment, the width of a bar may correspond to resource data included with the project planning information. Such resource data may include costs, personnel, or other resources associated with the project phase. Bars 302d and 302f-h include transition regions 304a-d in which the bar increases/decreases in width corresponding to a transition in the resource data. A bar increasing in width, such as seen in transition region 304a, may indicate an increase in the amount of the corresponding resource required for that project phase. A bar decreasing in width, such as seen in transition region 304d, may indicate a decrease in the amount of the corresponding resource required for that project phase. The shape of the transition region may correspond to a category of resource data. For example, a curved transition region, such as seen in transition region 304a, may correspond to costs resource data. A perpendicular change in width, such as seen in transition region 304b, may correspond to personnel data information. And a linear change in width over time, such as seen in transition region 304c, may correspond to another category of resource data.

In one exemplary embodiment, bars 302a-h may correspond to project planning information and bars 306a-b, which overlap with bars 302b and 302f, respectively, may correspond to actual project information. Bar 306b may vary in width symmetrically to convey additional information about the actual project phase. The variation in width may correspond to a transition in actual resource data received during the project. Bars 306a-b may be displayed coaxially with bars 302b and 302f to better illustrate discrepancies between planning information and actual information. Where the actual resource data exceeds the resource data included in the planning information, the width of the bar corresponding to the actual resource data may exceed the width of the bar corresponding to the project resource data (not shown).

A simplified real world example is now provided for illustrative purposes. In this example, a project for baking a cake will be described. This project includes phases of acquiring ingredients, mixing the ingredients, and baking the mixture. Each phase will have planning information regarding the length of time it will take, and will include resource data regarding the costs for completion and the required personnel.

A user may input information indicating that the phase of acquiring the ingredients for the cake will take one hour. The user may also specify that this phase will include additional costs for all of the ingredients purchased, and will require three full-time workers to acquire the ingredients. The user may additionally input information indicating that the phase of mixing the ingredients will take one half hour. For this phase, the user may specify that there will be no additional costs for mixing the ingredients, and that the phase may be completed by one full-time worker. Finally, the user may input information indicating that the phase of baking the ingredients will take one hour, and may input information indicating that this phase will include costs for operating an oven, but will only require one part-time worker to monitor the oven.

Figure 4:
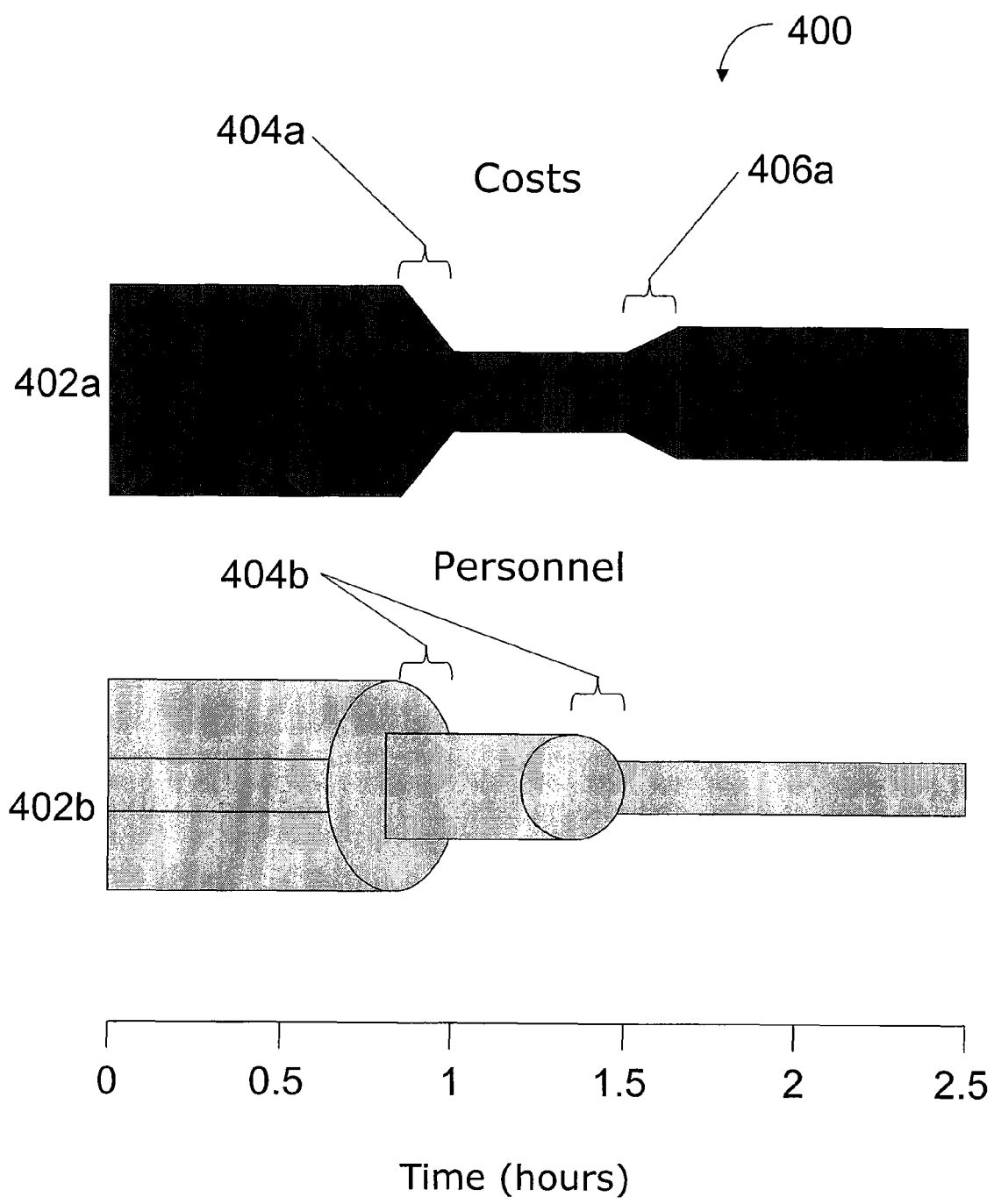
FIG. 4 is an exemplary graphical representation of information associated with an exemplary project in accordance with an aspect of the present invention.

FIG. 4 is an exemplary representation of a graph 400 generated from the planning information associated with the above described project. The graph 400 depicts two bars 402a and 402b with the length of each bar corresponding to the time required. The graph also depicts the bars having transition regions 404a-b and 406a in which the bars vary symmetrically in width at various times over the course of the project. The top bar 402a depicts costs resource data in addition to required time for each phase such that the variation of the width of the bar corresponds to a change in costs. For instance, when costs increase, the width of the bar increases, as shown in transition region 406a and when costs decrease, the width of the bar decreases, as shown in transition region 404a. The bottom bar 402b similarly depicts the personnel resource data for each phase. When required personnel decrease, the width of the bar decreases, as shown in transition regions 404b, and when required personnel increase, the width of the bar increases (not shown). Additionally, the shape of the transition region may correspond to the category of resource data. In the graph 400, a linear transition over time, as shown in transition regions 404a and 406a, corresponds to a change in costs; a curved transition, as shown in transition regions 404b, corresponds to a change in personnel.

One or more of the steps described above may be embodied in computer-executable instructions stored on a computer readable storage medium. The computer readable storage medium may be essentially any tangible storage medium capable of storing instructions for performance by a general or specific purpose computer such as an optical disc, magnetic disk, or solid state device, for example.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for presenting project information comprising the steps of:
    receiving electronic planning information associated with a project, the planning information including project resource data;
    transforming the received electronic planning information into a graphical representation of the received electronic planning information for visual presentation to a user; and
    presenting the graphical representation of the received planning information for perception by the user, the presented graphical representation including one or more lines that varies in width symmetrically over time based on the project resource data.

2. The method of claim 1, wherein the step of presenting the graphical representation comprises:
    presenting each of the one or more lines as a straight line.

3. The method of claim 1, wherein the project resource data includes at least one resource transition and wherein the step of presenting the graphical representation comprises:
    presenting the one or more lines with a transition region corresponding to the at least one resource transition.

4. The method of claim 3, wherein the project resource data includes a category and wherein the transition region has a shape corresponding to the category.

5. The method of claim 4, wherein the one or more lines extend in a first direction and wherein the shape of the transition region is an additional line perpendicular to the one or more lines.

6. The method of claim 4, wherein the shape of the transition region is a linear transition over time.

7. The method of claim 4, wherein the shape of the transition region is a curved transition over time.

8. The method of claim 1, further comprising the steps of:
    receiving actual information associated with the project, the actual information including actual project resource data;
    transforming the actual information into a graphical representation of the actual information; and
    presenting the graphical representation of the actual information, the presented graphical representation including one or more lines that varies in width symmetrically over time based on the actual project resource data.

9. The method of claim 8, wherein the step of presenting the graphical representation comprises:
    presenting the one or more lines corresponding to the actual information coaxially with the one or more lines corresponding to the planning information.

10. The method of claim 9, wherein the steps of presenting the graphical representation comprises:
    presenting the one or more lines corresponding to the actual information such that the width of the one or more lines exceeds the width of the one or more lines corresponding to the planning information.

11. The method of claim 1, wherein the presenting step comprises the step of:
    displaying the graphical information on a visual display.

12. The method of claim 1, wherein the transforming step comprises the step of:
    transforming, by a computer processor, the received planning information into the graphical representation.

13. The method of claim 12, wherein the receiving step comprises the step of:
    receiving, by the computer processor, the planning information.

14. The method of claim 1, wherein the presented one or more lines extend in a first direction and vary in width symmetrically in two directions at least substantially perpendicular to the first direction over time based on the project resource data.

15. A system for presenting project information comprising:
    means for receiving electronic planning information associated with a project, the planning information including project resource data;
    means for transforming the received electronic planning information into a graphical representation of the received electronic planning information for visual presentation to a user; and
    means for presenting the graphical representation of the received planning information for perception by the user, the presented graphical representation including one or more lines that varies in width symmetrically over time based on the project resource data.

16. The system of claim 15, wherein the project resource data includes at least one resource transition and the means for presenting the graphical representation comprises:
    means for presenting the one or more lines with a transition region corresponding to the at least one resource transition.

17. The system of claim 15, further comprising:
    means for receiving actual information associated with the project, the actual information including actual project resource data;
    means for transforming the actual information into a graphical representation of the actual information; and
    means for presenting the graphical representation of the actual information, the presented graphical representation including one or more lines that varies in width symmetrically over time based on the actual project resource data.

18. A computer readable storage medium having computer-executable instructions for presenting project information, the computer-executable instructions for performing operations comprising:
    receiving electronic planning information associated with a project, the planning information including project resource data;
    transforming the received electronic planning information into a graphical representation of the received electronic planning information for visual presentation to a user; and
    presenting the graphical representation of the received planning information for perception by the user, the presented graphical representation including one or more lines that varies in width symmetrically over time based on the project resource data.

19. The computer readable storage medium of claim 18, wherein the project resource data includes at least one resource transition and the operation of presenting the graphical representation comprises:

presenting the one or more lines with a transition region corresponding to the at least one resource transition.

20. The computer readable storage medium of claim 18, the computer-executable instructions for performing operations further comprising:

receiving actual information associated with the project, the actual information including actual project resource data;

transforming the actual information into a graphical representation of the actual information; and presenting the graphical representation of the actual information, the presented graphical representation including one or more lines that varies in width symmetrically over time based on the actual project resource data.

* * * * *